US008804719B2

(12) United States Patent
Aldrin et al.

(10) Patent No.: US 8,804,719 B2
(45) Date of Patent: Aug. 12, 2014

(54) IN-BAND MULTICAST TRACE IN IP AND MPLS NETWORKS

(75) Inventors: Sam K. Aldrin, Santa Clara, CA (US); Azhar M. Sayeed, Shrewsbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 173 days.

(21) Appl. No.: 12/826,211

(22) Filed: Jun. 29, 2010

(65) Prior Publication Data
US 2011/0317696 A1    Dec. 29, 2011

(51) Int. Cl.
H04L 12/28    (2006.01)
(52) U.S. Cl.
USPC .......................................................... 370/390
(58) Field of Classification Search
None
See application file for complete search history.

(56) References Cited

U.S. PATENT DOCUMENTS

| | | | | |
|---|---|---|---|---|
| 7,599,303 | B2 | 10/2009 | Nadeau et al. | |
| 7,684,351 | B2* | 3/2010 | Vasseur et al. | 370/255 |
| 2002/0075871 | A1* | 6/2002 | Blanc et al. | 370/390 |
| 2004/0165601 | A1* | 8/2004 | Liu et al. | 370/401 |
| 2006/0262772 | A1 | 11/2006 | Guichard et al. | 370/351 |
| 2007/0217420 | A1* | 9/2007 | Raj et al. | 370/392 |
| 2008/0025309 | A1 | 1/2008 | Swallow | |
| 2010/0271960 | A1* | 10/2010 | Krygowski | 370/248 |

OTHER PUBLICATIONS

Farrel et al., "Detecting Data Plane Failures in Point-to-Multipoint Multiprotocol Label Switching (MPLS)—Extensions to LSP Ping", Internet-Draft, draft-ietf-mpls-p2mp-lsp-ping-07.txt, Network Working Group, The IETF Trust, Sep. 10, 2008.*
Cheng, "RSVP-TE: Extensions to RSVP for Multicast LSP Tunnels", Internet-Draft, draft-cheng-mpls-rsvp-multicast-er-00.txt, Network Working Group, Oct. 2001.*
Bahadur et al, "Mechanism for performing LSP-Ping over MPLS tunnels", Internet-Draft, draft-ietf-mpls-lsp-ping-enhanced-dsmap-02, Network Working Group, The IETF Trust, Feb. 1, 2009.*
Asaeda et al., "Mtrace Version 2: Traceroute Facility for IP Multicast", Internet-Draft, draft-ietf-mboned-mtrace-v2-06, MBONED Working Group, IETF Trust, Jan. 23, 2010.*
Farrel et al., *Detecting Data Plane Failures in Point-to-Multipoint Multiprotocol Label Switching (MPLS)—Extensions to LSP Ping*, Mar. 2010, available at http://www.ietf.org/id/draft-ietf-mple-p2mp-lsp-ping-10.txt, accessed May 25, 2010.
Kompella et al., *Detecting Multi-Protocol Label Switched (MPLS) Data Plane Failures*, Feb. 2006, available at http://tools.ietf.org/html/rfc4379 accessed May 21, 2010.

* cited by examiner

*Primary Examiner* — Dang Ton
*Assistant Examiner* — Ronald H Davis
(74) *Attorney, Agent, or Firm* — Brinks Gilson & Lione

(57) ABSTRACT

In one embodiment, which may be implemented in either IP networks or MPLS networks, a tree of the network may be constructed at a source network device by sending only a single packet. The remaining network devices in the network replicate the packet so that a copy will reach each of the egress nodes. Along the way, identity information from each node or hop will be added to the replicated packets. As the egress nodes receive the packets, the egress nodes will each send a reply packet to the source network device. The reply packet includes a list of every hop on the path. The source network device is configured to construct a tree of the network based on the reply packets.

22 Claims, 6 Drawing Sheets

```
                            313
+-+-+-+-+-+-+-+-+-+-+-+-+-+-+-+-+-+-+-+-+-+-+-+-+-+-+-+-+-+-+-+-+
|   Cisco ext tlv = 0xFC00          |     Cisco ext tlv Length    |
+-+-+-+-+-+-+-+-+-+-+-+-+-+-+-+-+-+-+-+-+-+-+-+-+-+-+-+-+-+-+-+-+
|     Vendor field (set to cisco vendor id) = 0x00000009         |
+-+-+-+-+-+-+-+-+-+-+-+-+-+-+-+-+-+-+-+-+-+-+-+-+-+-+-+-+-+-+-+-+
|   revision subtlv = 0x0001        |    subtlv length = 0x0004   |
+-+-+-+-+-+-+-+-+-+-+-+-+-+-+-+-+-+-+-+-+-+-+-+-+-+-+-+-+-+-+-+-+
|                          <TLV revision>                        |
+-+-+-+-+-+-+-+-+-+-+-+-+-+-+-+-+-+-+-+-+-+-+-+-+-+-+-+-+-+-+-+-+
|   reply-dscp subtlv = 0x0002      |    subtlv length = 0x0004   |
+-+-+-+-+-+-+-+-+-+-+-+-+-+-+-+-+-+-+-+-+-+-+-+-+-+-+-+-+-+-+-+-+
|   <reply-dscp     |       Pad with zero = 0x000000              |
+-+-+-+-+-+-+-+-+-+-+-+-+-+-+-+-+-+-+-+-+-+-+-+-+-+-+-+-+-+-+-+-+
```

FIG. 4

```
                            315
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Upstream subtlv = 0x0003        |     subtlv length          |
+-+-+-+-+-+-+-+-+-+-+-+-+-+-+-+-+-+-+-+-+-+-+-+-+-+-+-+-+-+-+-+-+
|   ttl value    |    Command value  |  0x0000                   |
+-+-+-+-+-+-+-+-+-+-+-+-+-+-+-+-+-+-+-+-+-+-+-+-+-+-+-+-+-+-+-+-+
|                  Number of Upstream indices                    |
+-+-+-+-+-+-+-+-+-+-+-+-+-+-+-+-+-+-+-+-+-+-+-+-+-+-+-+-+-+-+-+-+
|             Upstream IP Address (4 or 16 octets)               |
+-+-+-+-+-+-+-+-+-+-+-+-+-+-+-+-+-+-+-+-+-+-+-+-+-+-+-+-+-+-+-+-+
|         Upstream Interface Address (4 or 16 octets)            |
+-+-+-+-+-+-+-+-+-+-+-+-+-+-+-+-+-+-+-+-+-+-+-+-+-+-+-+-+-+-+-+-+
|                Upstream Label              |     Protocol      |
+-+-+-+-+-+-+-+-+-+-+-+-+-+-+-+-+-+-+-+-+-+-+-+-+-+-+-+-+-+-+-+-+
|         . . . . . . . . . . . . . . . .                        |
+-+-+-+-+-+-+-+-+-+-+-+-+-+-+-+-+-+-+-+-+-+-+-+-+-+-+-+-+-+-+-+-+
```

IN-BAND MULTICAST TRACE IN IP AND MPLS NETWORKS

TECHNICAL FIELD

The present embodiments generally relate to a packet switched network (PSN).

BACKGROUND

PSNs may include unicast and multicast Internet protocol (IP) networks and multiprotocol label switching (MPLS) networks. Routing schemes used on PSNs include unicast and multicast. Unicast is the sending of messages to one network destination host on a PSN. Multicast involves sending message to many network destinations or distribution points (end points). These distribution points are reached by traversing various routers (tree joints).

Troubleshooting unicast IP networks may involve Internet Control Message Protocol (ICMP) including ping and trace tools, which allow the connectivity from point A to point B to be determined. Troubleshooting unicast MPLS networks may involve a version of ping and trace tools for MPLS. In multicast, an mtrace tool on a source transmits to the multicast group to find the last hop before a destination. The mtrace tool then follows the multicast path from destination to source by sending a request packet to each hop using unicast. Using the mtrace tool places a high burden on the source.

BRIEF DESCRIPTION OF THE DRAWINGS

FIG. 4 illustrates one embodiment of a type-length-value (TLV) element of the packet of FIG. 3.

FIG. 5 illustrates a portion of the TLV element of FIG. 4.

DESCRIPTION

Overview

Figure 1:
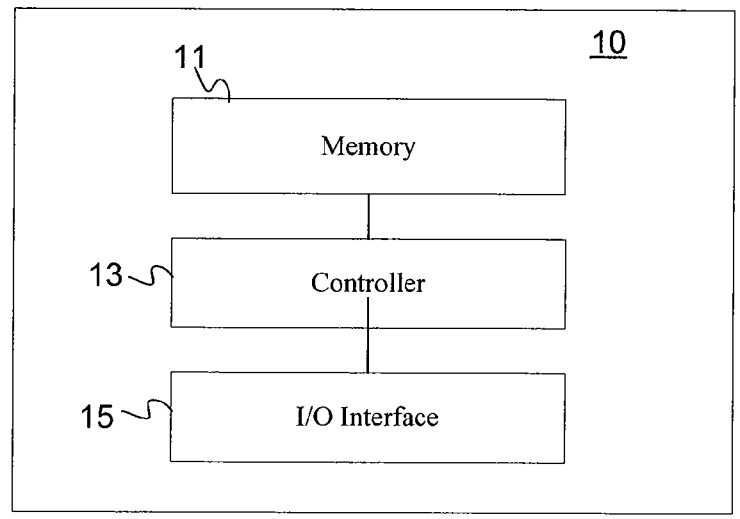
FIG. 1 illustrates one embodiment of a network device.

In one embodiment, which may be implemented in either IP networks or MPLS networks, a tree of the network may be constructed at a source network device by sending a single packet. The remaining network devices in the network take over, replicating the packet so that a copy reaches each of the egress nodes. Along the way, identity information from each node is added to the replicated packets. As the egress nodes receive the replicated packets, the egress nodes each send a reply packet to the source network device. The reply packet includes a list of every hop on the path. The source network device is configured to construct a tree of the network based on the reply packets.

In one aspect, an apparatus, such as a network device, includes an interface operable to receive a packet, a processor configured to identify a plurality of paths from the apparatus to one or more next hop network devices and replicate the packet for each of the plurality of paths to produce a plurality of upstream packets, and a memory coupled with the processor, the memory storing an upstream type-length-value (TLV) including information regarding the identity of the apparatus. Further, the processor is configured to add the upstream TLV to each of the upstream packets for transit to the one or more next hop network devices via the plurality of paths.

In a second aspect, a method includes receiving a packet at an intermediate network device, identifying a plurality of paths to one or more next hop network devices, adding an upstream type-length-value (TLV) including information regarding the identity of the intermediate network device to the packet, replicating the packet, for each of the plurality of paths, wherein the replicated packets are a plurality of upstream packets, and forwarding the plurality of upstream packets to the one or more next hop network devices via the plurality of paths.

In a third aspect, an apparatus, such as a network device, includes an interface operable to send an outbound packet to a network and receive a plurality of reply packets from at least one egress node of the network, wherein the plurality of reply packets identify a plurality of intermediate network devices along a path from the source network device to the at least one egress node, a memory configured to store the plurality of reply packets received by the interface, and a processor configured to construct a tree of the network based on the plurality of reply packets accessed from the memory, wherein each of the plurality of reply packets originates with the outbound packet.

In a fourth aspect, a method includes sending a packet from a source network device to a network, receiving a plurality of reply packets from at least one egress node of the network, the plurality of reply packets each identifying a path from the source network device to one of the at least one egress node, and constructing a tree of the network based on the plurality of reply packets.

Example Embodiments

The Operations, Administration and Maintenance (OAM) subsystem in a network device monitors the network and diagnoses faults in the paths between network devices. First, all, some, or most of the existing paths between two network devices are identified. Then, the performance of each path is determined. If a path is broken or performing unsatisfactorily, the exact location of the break may be determined.

In MPLS, direct links are created between distant network devices using labels. The labels are assigned to packets. The packets are then forwarded based on the label without reading the forwarding information in the packet. Packets with a particular label follow the same route from a beginning point to an ending point. Effectively, direct links called label switched paths (LSPs) are created as end to end circuits.

LSPs allow the service providers to aggregate traffic. For example, if a service provider has customer A and customer B, the service provider can assign a first LSP to customer A and a second LSP to customer B. The service provider can give attributes to the LSPs based on the subscriptions that the customers have. Further, the service provider may set the LSPs to give customer A priority over customer B. A set of packets with common destination is a forwarding equivalence class (FEC). The common destination may be included in an MPLS label. Consequently, a particular FEC tends to correspond to a LSP and an egress router for an FEC is an egress router for the corresponding LSP.

At any given point of time, it is difficult to identify all of the paths without actually traversing each of the paths. When a source sends a ping request, the source receives multiple responses from the distribution points. When trace is performed, one needs to flood the network to traverse all the possible paths, hop by hop, to build a tree.

Within IP networks, a source router correlates the request responses using variables such as unique ID, source address and destination address. The problem is compounded within MPLS networks as the source router must validate the error codes for the state of LSPs. This causes overload on the source router leading to scale issues.

Using the present embodiments, in either IP networks or MPLS networks, a tree of the network may be constructed at a source network device by sending a single packet, which may be referred to as an outbound packet. The remaining network devices in the network take over, performing the decisions necessary to provide all of the information necessary to construct the tree. The processes described below may be used as part of or as an alternative to the discovery protocol.

FIG. 1 illustrates one embodiment of a network device 10. The network device 10 includes a memory 11, a controller 13, and an input/output (I/O) interface 15. Additional components may be provided. For example, the network device 10 may include a wireless communication system, such as a radio, for communicating wirelessly. In addition, the network device 10 may include a power supply. Controller 13 may be coupled with the other components via a bus, circuit, wire, cable, network (e.g., wired or wireless), or other connection.

The network device 10 may be a router, a switch, or any device capable of forwarding, sending, or receiving data. The data may be encapsulated in packets. The network device 10 may connect with logical subnets. The network device 10 may operate as a Layer 3 device, a Layer 2 device, or both a Layer 2 and Layer 3 device.

In the Open Systems Interconnection (OSI) model, Layer 2, the Data Link Layer, is the protocol layer which transfers data between adjacent network nodes in a wide area network or between nodes on the same local area network. Layer 2 protocols include Ethernet, the Point-to-Point Protocol (PPP), and High-Level Data Link Control (HDLC) and Advanced Data Communication Control Procedures (AD-CCP) for dual node connections.

In the OSI model, Layer 3, the network layer, manages the source-to-destination delivery of packets and routing through intermediate host. This contrasts with Layer 2, which is responsible for the node-to-node delivery of packets. Layer 3 addresses devices using Internet Protocol (IP), routes data on the level of determining the final destination of packets and selecting the next hop, and determines network errors.

MPLS may be referred to as Layer 2.5 protocol because MPLS shares functionality of the Data Link Layer (Layer 2) and the Network Layer (Layer 3) in the OSI Model. MPLS may carry different kinds of traffic, including IP packets and Ethernet frames.

The memory 11 may be a volatile memory or a non-volatile memory. The memory 11 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 11 may include an optical, magnetic (hard drive) or any other form of data storage device. The memory 11 may be located in a remote device or removable, such as an SD memory card.

The memory 11 may store computer executable instructions. The controller 11 may execute computer executable instructions. The computer executable instructions may be included in computer code. The computer code may be stored in the memory 11. The computer code may be written in any computer language, such as C++, C#, Java, Pascal, Visual Basic, Perl, HyperText Markup Language (HTML), JavaScript, assembly language, and any combination thereof.

The computer code may be logic encoded in one or more non-transitory tangible media for execution by the controller 11. Logic encoded in one or more tangible media for execution may be defined as instructions that are executable by the controller 11 and that are provided on the computer-readable storage media, memories, or a combination thereof.

Controller 13 may comprise a general processor, digital signal processor, application specific integrated circuit, field programmable gate array, analog circuit, digital circuit, combinations thereof, or other now known or later developed processor. The controller 13 may be a single device or combinations of devices, such as associated with a network or distributed processing. Any of various processing strategies may be used, such as multi-processing, multi-tasking, parallel processing, remote processing, centralized processing or the like. The controller 13 may be responsive to or operable to execute instructions stored as part of software, hardware, integrated circuits, firmware, micro-code or the like. The functions, acts, methods or tasks illustrated in the figures or described herein may be performed by the controller 13 executing instructions stored in the memory 11. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

I/O interface 15 may include any operable connection, such as a port. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection. For example, I/O interface 15 may comprise a first communication interface devoted to sending data, packets, or datagrams and a second communication interface devoted to receiving data, packets, or datagrams. Alternatively, I/O interface 15 may be implemented using a single communication interface.

The network device 10 may be configured to perform ping and trace tools, which may be unicast or multicast on either an IP network or MPLS network. Ping and trace are performed using internet control message protocol (ICMP) packets. The ping tool tests whether a particular host is reachable across a network and measures the round-trip time for packets sent from the local host to a destination host. The trace (traceroute) tool is used to show the route taken by packets across the network. The network device 10 may run utility applications that perform ping and/or trace (traceroute).

The ping utility sends an ICMP packet with an echo request to a destination. The ICMP packet response, which may be referred to as a pong, indicates statistics including the transit time of the ICMP packet. If no response is received from the target in a predetermined amount of time, the ping utility registers a timeout. A timeout indicates that the path is broken.

The trace utility, without the benefit of the current embodiments, works by increasing the time-to-live (TTL) value of a series of packets. The TTL value counts the number of iterations or the number of times a packet may be forwarded. The TTL field may be set by the sender of the packet and reduced by every host on the route to the destination. The TTL field is reduced by one on every hop and may be called a hop limit in IPv6. If the TTL field reaches zero before the datagram arrives at the destination, then the datagram is discarded and an ICMP error is sent back to the sender. The purpose of the TTL field is to avoid a situation in which an undeliverable packet infinitely circulates on a network.

The first series of packets sent have a TTL value of one. A TTL value of one indicates that they are not forwarded by the next router. That is, the packets only make a single hop. The next series of packets have a TTL value of two. A TTL value of two means that the packets make two hops and reach the routers that are another layer away from the source router or other device.

The process continues in a similar manner. Along the way, the TTL value is decremented by the routers before forwarding to the next router. When a packet with a TTL value of one reaches a router, the host discards the packet and sends an ICMP time exceeded packet to the sender. The traceroute tool uses the response ICMP packets to produce a list of routers that the ICMP packets have traversed to the destination. Using this process, the source router sends out many packets.

The network device 10 may also be configured to perform mtrace to identify the path from a source to a destination in a multicast tree. The mtrace tool is built on the trace tool. The mtrace tool generates several trace requests to identify the router before the destination. The network device 10 may then sequentially transmit a packet to each hop along the way and receive a response from each hop.

The network device 10 may also be configured to perform MPLS tree trace in either unicast or multicast networks. MPLS tree trace identifies all of the paths between two routers on the network. MPLS tree trace validate LSPs based the same techniques as IP ping and trace with a difference of payload.

When a ping packet is sent across the MPLS network, the ping packet traverses the network along the LSP and reaches a transit node or egress node. As the ping packet is forwarded, the TTL value is decremented at each hop. The ping packet will be forwarded until TTL=0 or until the ping packet reaches an egress node or distribution point, whatever comes first. The intelligence is built into the sending (source) router in sourcing of packets to identify and trace all the nodes in the network. The source router explicitly traces each of the paths and constructs the LSPs.

In addition or in the alternative to the IP, MPLS, unicast, and multicast ping and trace tools discussed above, the network device 10 may be configured to deal with performance monitoring and troubleshooting unicast and multicast networks in a way that moves the intelligence away from the source router. The intelligence is distributed across the network such that functions of the ping and trace are implemented across the network using a single packet or fewer packets than implemented by the source router in the above techniques.

Figure 2:
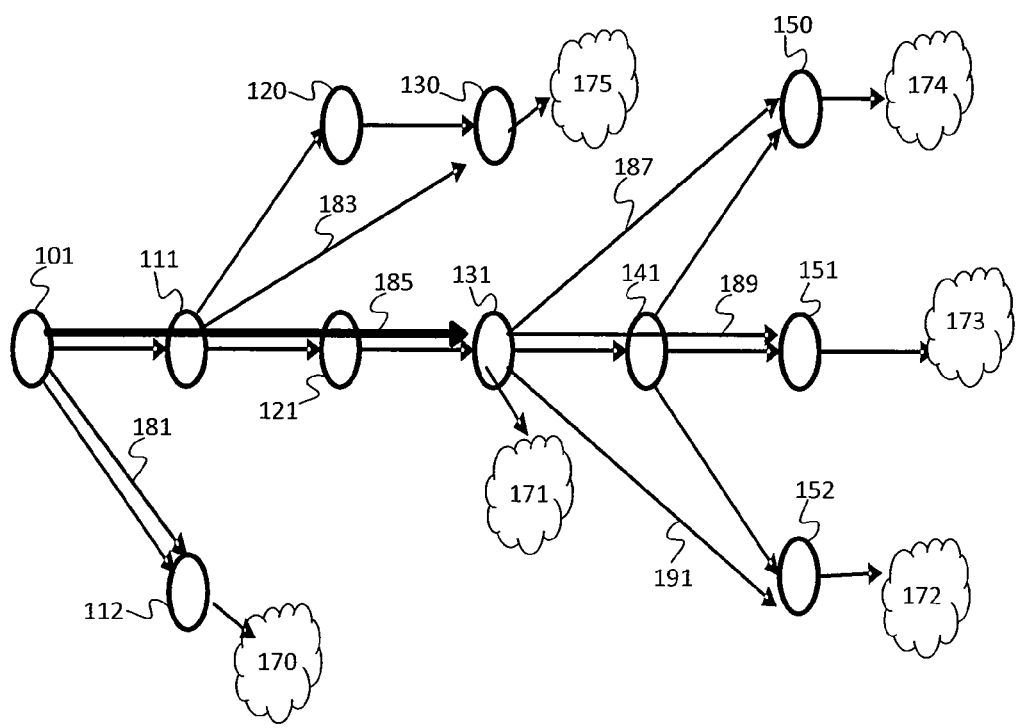
FIG. 2 illustrates one embodiment of a network including a plurality of network devices.

FIG. 2 illustrates one embodiment of an example network including several network devices, such as the network device 10 shown in FIG. 1 or different network devices. For the purposes of discussion, the network includes a source router 101 and four transit nodes at routers 111, 121, 141, and 120. Five egress nodes at routers 112, 152, 151, 150, and 130 are distribution points that connect the network to IP networks 170-175. In addition, router 131 is a bud node because it is a transit node as well as an egress node. Each of the network devices are coupled to one another by communication paths. As used herein, "coupled with" includes directly connected or indirectly connected through one or more intermediary components. Intermediary components may include hardware and/or software.

An example set of the paths, which may include all of the paths on the network, from neighboring network devices are shown in FIG. 2. In addition, some examples of LSP ping packet paths are shown. For example, LSP ping packet path 181 connects router 101 and router 112; LSP ping packet path 183 connects router 111 with router 130; LSP ping packet path 185 connects router 101 with 131; LSP ping packet path 187 connects router 131 with router 150; LSP ping packet path 189 connects router 131 with router 151; and LSP ping packet path 191 connects router 131 with router 152.

A sending network device, which may be source router 101, sends a packet into the network. The packet may be a trace packet or a ping packet. Instead of simply replying back to the sending router, each router that receives the packet identifies which of the following categories the respective router fits into: (a) the node is an egress node; (b) the node is egress node as well as transit node (bud node); (c) the node is a transit node but not an egress node; or (d) the router is not in the path.

The reply from each router to the sending router may be defined using a return code. The return code may be included in either an IP packet or a MPLS packet. In the case of LSPs, the return codes may be conveyed in the manner described in RFC 4379, published February 2006. The return codes described in RFC 4379 are often referred to as error codes or error values. However, the information conveyed by the error codes may not be related to an error in the present embodiments.

When the router is in category (a) (i.e., the node is an egress node), the router responds back reporting itself as an egress router by setting a return code to a value designated for egress routers. For example, using the return codes in RFC 4379, the return code may be set to an error value of 3 (e.g. replying router is an egress for the FEC) or any other value as needed to indicate that the router is an egress router.

When the router is in category (b) (i.e., the node is egress node as well as transit node), the router responds back with a response indicating a bud node. In one example, the router may respond with both a downstream detailed mapping TLV and a return code set to an error value of 3 or any other error value as needed, as described in RFC 4379. The downstream detailed mapping TLV is not used by egress nodes. The error value of 3 is used by egress nodes. Therefore, the combination of the downstream detailed mapping TLV and the return code error value of 3 is one example of an indication of a bud node. Additional examples are possible. The router also replicates the packet and sends the packet to the next hops via each of the possible egress paths.

When the router is in category (c) (i.e., the node is a transit node only), the router does not respond. Instead, the router simply replicates the packet and sends the packet to the next hops via each of the possible egress paths. In one exception, the category (c) router may be configured to reply if a command TLV is present that explicitly provides for such a reply. For example, using the return codes of RFC 4379, a response may be returned with an error code value of 0 to indicate no error code is returned.

When the router is in category (d) (i.e., the node is not in the path at all), the router replies back to the source router, or other sending network device, with an appropriate response. For example, using the return codes of RFC 4379, the response may include an error code value of 11 (e.g., no label entry) or any other value as needed to indicate that the router is not in the path.

Using FIG. 2 as an example, when source router 101 sends a packet, it is received at router 111 and router 112 when TTL=1. Each of router 111 and router 112 identifies itself. Router 111 identifies itself as a category (c) router, and accordingly, router 111 does not respond to source router 101. Instead, router 111 replicates the packet and sends a replicated packet to router 120, a replicated packet to router 130, as well as a replicated packet to router 121.

Router 112 identifies itself as a category (a) router. Accordingly, router 112 simply identifies itself as an egress node in a response sent back to the source router 101. Source router 101 now has identified one egress path of the network.

Router 130 receives a replicated packet from router 111. Router 130 identifies itself as a category (a) router. Accordingly, router 130 simply identifies itself as an egress node in a response sent back to the source router 101. Source router 101 now has identified two egress paths of the network.

Router 120 and router 121 receive the replicated packets sent from router 111. Router 120 and router 121 each identifies itself as a category (c) router. Accordingly, router 120 replicates the packet and sends the replicated packet to router 130, and router 121 replicates the packet and sends the replicated packet to router 131. Router 130, as discussed above, is an egress node. Accordingly, router 130 identifies itself as an egress node in a response sent back to the source router 101. However, source router 101 has already received a response from router 130 based on this packet. Source router 101 acknowledges that there is a second path to router 130. Alternatively, router 130 may determine that router 130 has already responded to this request and note that in the second reply packet.

Router 131 is a bud node because router 131 functions as both a transit node and an egress node. Therefore, router 131 identifies itself as a category (b) router. Accordingly, router 131 responds back to source router 101 with a response as a bud node, and router 131 also replicates the packet and sends the packet to router 141, router 150, and router 152. The process repeats until each of the possible egress paths are identified.

In one embodiment, the network includes only one egress node or router but includes multiple paths from the source node or router. In other words, the network includes multiple egress paths that terminate with a single egress node. In this example, the egress node will send more than one reply packet to the source node or router.

Figure 3:
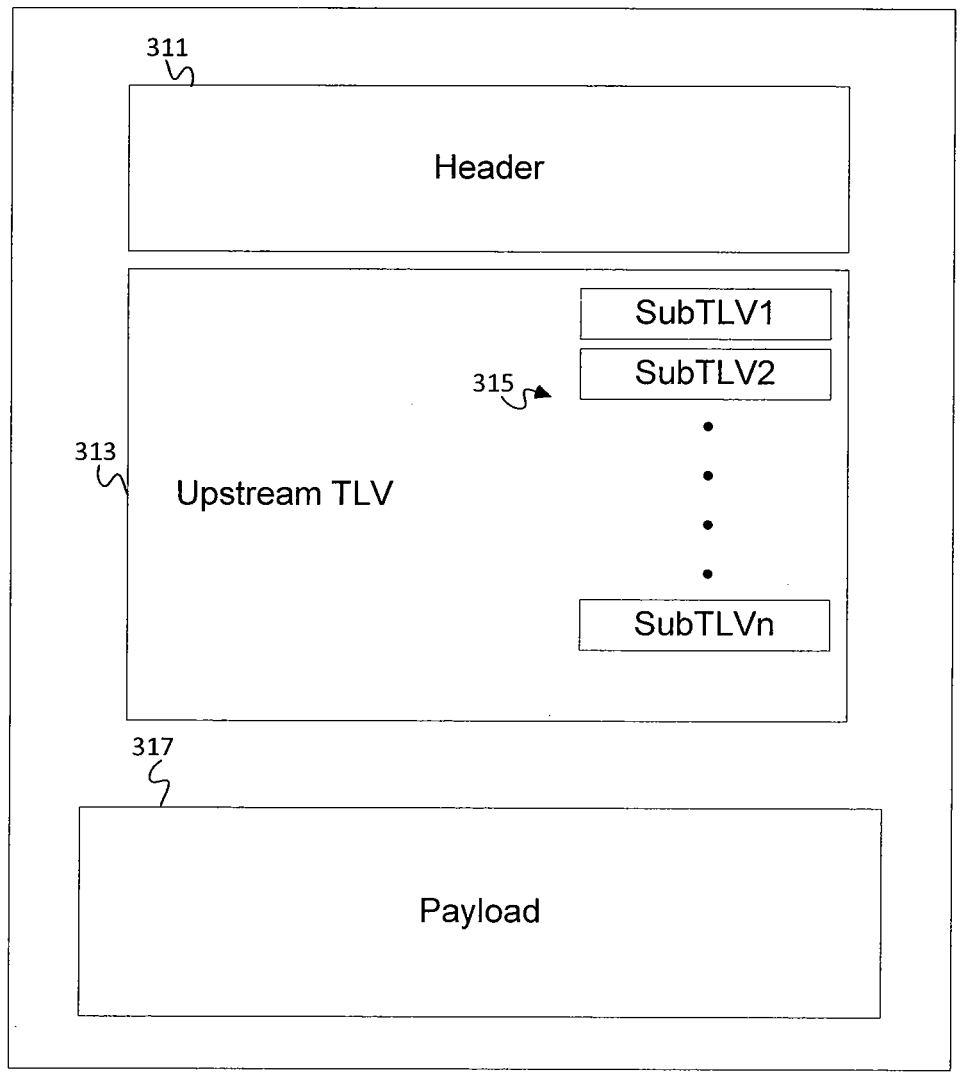
FIG. 3 illustrates one embodiment of a ping or trace packet that may be forwarded on the network of FIG. 2.

FIG. 3 illustrates a ping or trace packet that could be implemented by the process discussed above. The packet includes the data and fields for the ping or trace utility, which include but are not limited to a header 311 and a payload 317. Additional, different, or fewer fields may be provided.

In addition, each category (b) and category (c) router adds a new type-length-value (TLV) element to the packet. The new TLV element may be referred to as an upstream TLV 313. The upstream TLV 313 includes information about the forwarding routers, including identity information such as an IP address.

Each forwarding router adds a subTLV 315 into the upstream TLV 313. When the packet reaches the egress router, the packet contains identity information for all of the transit nodes in the subTLVs 315 of upstream TLV 313. The reply back to the source includes the identity information. Because all or many of the possible paths are traversed by the replicated packets, the source router receives a reply from each of the egress routers. In this way, the source router receives information to easily construct the tree of the network.

FIG. 4 illustrates a more detailed view of one implementation of upstream TLV 313. For example, upstream TLV 313 may include the various fields found in a typical vendor TLV.

FIG. 5 illustrates a more detailed view of one implementation of subTLV 315 of upstream TLV 313. For example, subTLV may include the TTL field, a command value, the number of upstream indices (number of neighboring upstream routers), the upstream IP address, the upstream interface address, and an upstream label.

The TTL field in the subTLV 315 contains the value for the packet to be circulated again. Normally, this value is the same TTL value as used for the packet. The default value of the TTL field may be 255. However, the value of the TTL field in the subTLV 315 may be set to any user configured value. For example, the TTL field may be set to 2, which causes the TTL to expire two hops away from the source, in which case, the node responds back to the source without forwarding the packet.

The command value is used to specifically carry any commands to instruct the router on how to process the packet. The set of commands include: (1) reply to sender, (2) forward to downstream router, (3) forward to downstream router and reply to sender, and (4) no forward to downstream router and no reply to sender. More command sets could be included.

In one embodiment, the upstream TLV 313 may be implemented in a way that insures backward compatibility with existing network devices. For example, the upstream TLV 313 may be included only as a vendor specific TLV. A vendor specific TLV may be ignored by network devices which do not match the vendor_id field listed in the packet.

When the network device does not match the vendor_id field, the process relies on the classic model of trace and ping. A multicast ping is performed prior to trace and all the egress nodes are obtained. A multicast trace is performed and all the missing egress nodes are identified from the ping response. Then, a directed trace is issued to each of the missing egress node to see how far the trace could go. Thus, nodes that do not support the OAM may be identified.

A router on the network that cannot process the upstream TLV 313 does not upset the process discussed above. Such a router may be referred to as a legacy router or an unsupported router. If the legacy router is unable to process the upstream TLVs, the legacy router simply ignores the upstream TLVs because the upstream TLVs are not listed as mandatory TLV. The legacy router processes with the processing of rest of the ping packet payload, including sending a reply packet to the source router. Upon receiving the response, the source router identifies the sender of the reply packet and acts accordingly. If the response is received from a legacy router that is an egress router, then the source router will have identified a distribution point and can construct the network hop by hop, as discussed above. If the response is received from a legacy router that is a transit router, the source router can adjust the TTL of a new packet to bypass the router that does not support the OAM.

Figure 6:
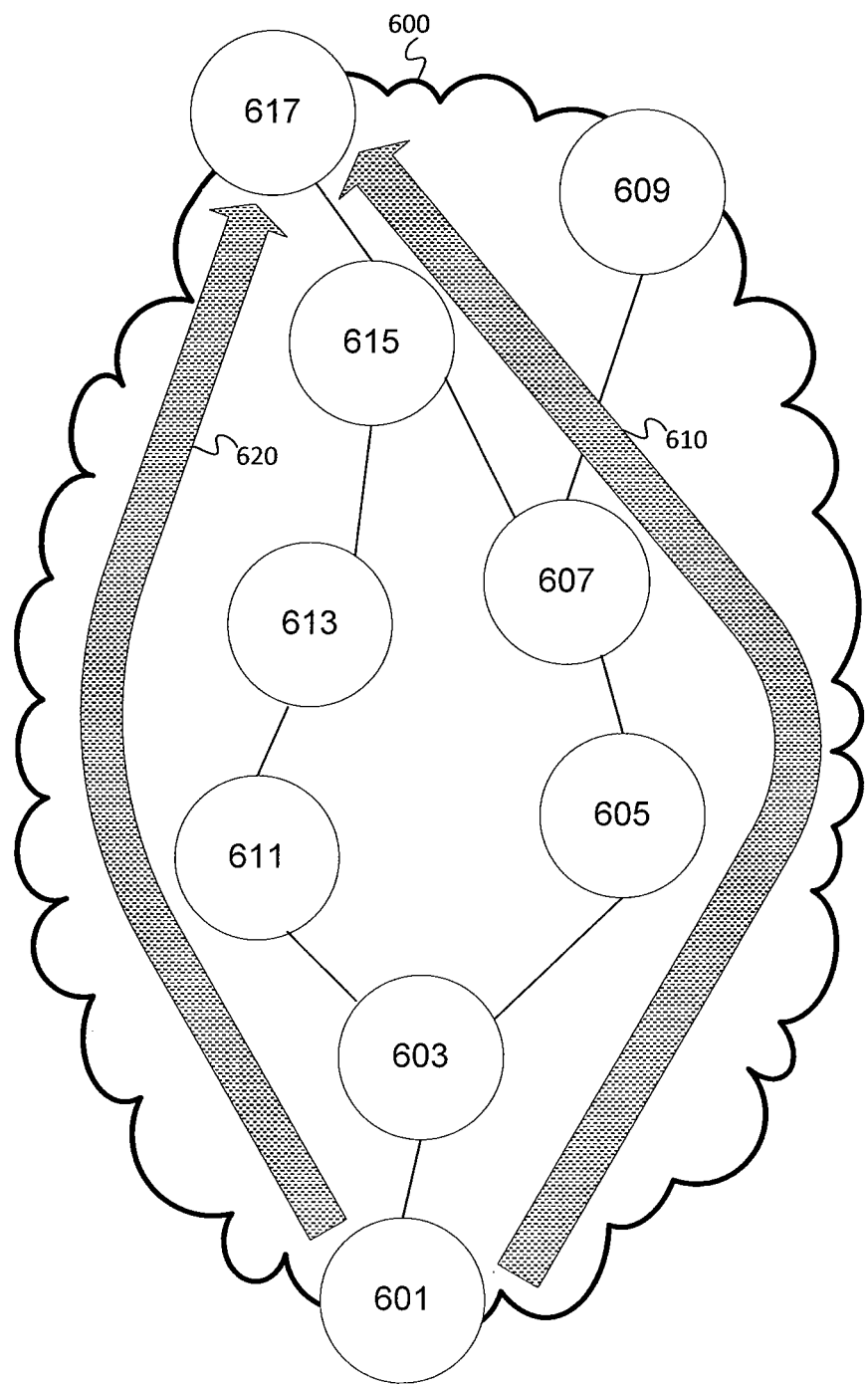
FIG. 6 illustrates one embodiment of a Traffic Engineering Fast Reroute (TE-FRR) network configured to forward the packet of FIG. 3.

In addition to multicast networks, the processes above may be applied to unicast networks. For example, FIG. 6 illustrates a Traffic Engineering Fast Reroute (TE-FRR) network 600. The TE-FRR network 600 includes network devices 601-617. There are two paths from network devices 601 to network device 617. The first path 610 traverses network devices 601-603-605-607-615-617. The second path 620 traverses network device 601-603-611-613-615-617.

As shown in FIG. 6, the second path 620 is a backup fast re-route (FRR) tunnel from network device 601 to network device 617. With FRR tunnels, there exists a problem with identifying errors in the first path when the second path is error free. With backup paths configured for FRR tunnels, there is no way to test the backup paths, which would require forcing the packets through the backup paths. Monitoring the status of the backup paths is not possible without using probe packets that traverse the backup path one network device at a time.

A network device configured to utilize the algorithm above for forwarding ping or trace packets provides a way to force the packets to take the backup path, thus verifying the LSP. For example, when a packet reaches network device 601, network device 601 queries if there exists multiple paths, including backup paths. If so, the packet is replicated and forwarded on all those paths. Thus, both the paths are verified and reported to the sender by network device 617.

In addition, a network device configured to utilize the algorithm above for forwarding ping or trace packets provides a way to trace a tree of a network not only using the protocols discussed in detail, but also within other protocols, such as label distribution protocol (LDP). In the case of LDP, tracing can be performed in-band, even with a large number of equal cost multi-path (ECMP) routing paths.

Figure 7:
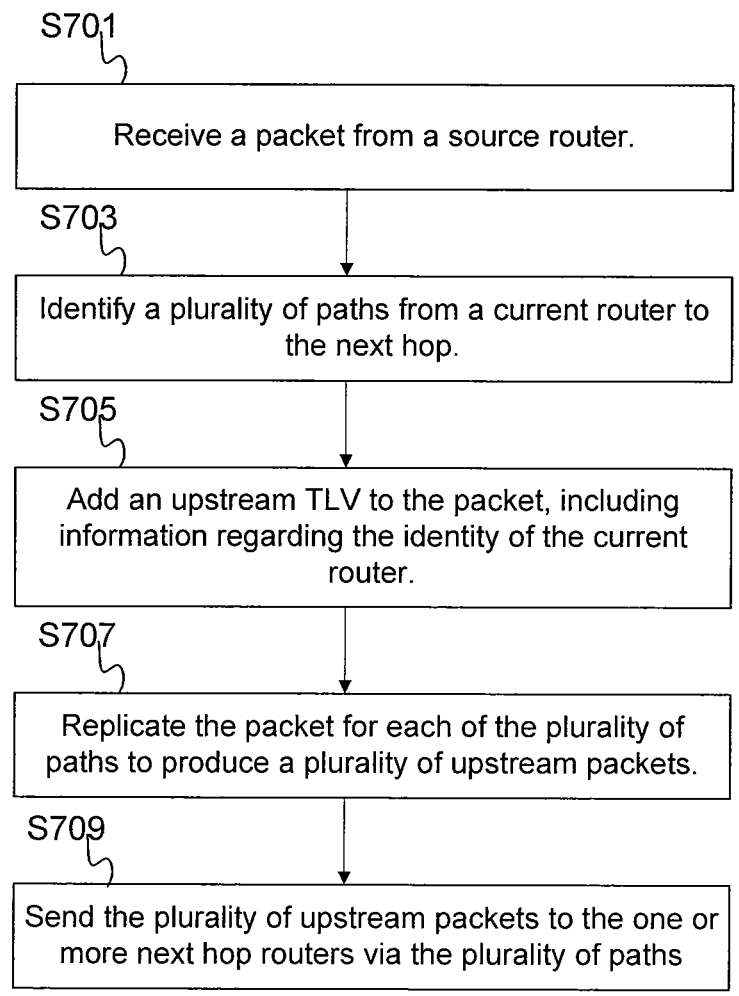
FIG. 7 illustrates a flow chart of the process of forwarding the packet of FIG. 3.

FIG. 7 illustrates a flow chart of the process of forwarding packets to trace a network. At S701, the network device receives a packet from a source router. At S703, the network device identifies a plurality of paths from the network device to one or more next hop network devices. In other words, the network device identifies every neighboring network device except the one that delivered the packet. At S705, the network device adds an upstream type-length-value (TLV) to the packet, wherein the TLV includes information regarding the identity of the current network device. At S707, the network device replicates the packet for each of the plurality of paths to produce a plurality of upstream packets. At S709, the network device sends the plurality of upstream packets to the one or more next hop network devices via the plurality of paths.

The process of FIG. 7 may be repeated for other network devices. The destination nodes reply back to the source rather than performing the process of FIG. 7. The source network device may construct the network tree or determine paths to the destination devices from the reply messages.

Figure 8:
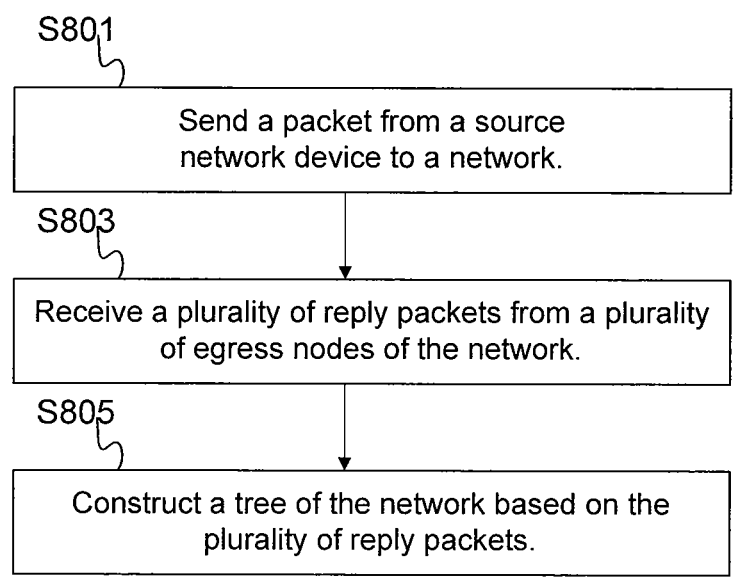
FIG. 8 illustrates a flow chart of the process of a source network device in FIG. 3.

FIG. 8 illustrates a flow chart of the process of a source network device in FIG. 3. At S801, the source network device sends a packet from a source network device to a network. At S803, the source network device receives a plurality of reply packets from a plurality of egress nodes of the network. The plurality of reply packets each identifies a path from the source network device to one of the plurality of egress nodes. At S805, the source network device constructs a tree of the network based on the plurality of reply packets. A single network device may be configured to perform both the process of FIG. 7 and the process of FIG. 8. Selection of the processes may be user configurable.

Instructions for instructing a network device in the process discussed above may be stored on any computer readable medium. As used herein, a "computer readable medium" includes, but is not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

Instructions for instructing a network device in the process discussed above may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

To the extent that the phrase "one or more of, A, B, and C" is employed herein, the phrase is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

Various embodiments described herein can be used alone or in combination with one another. The foregoing detailed description has described only a few of the many possible implementations of the present invention. For this reason, this detailed description is intended by way of illustration, and not by way of limitation.

We claim:

1. An apparatus comprising:
    an interface configured to receive a packet from a router in a network, the packet initiated by a source network device;
    a processor configured to identify a plurality of paths from the apparatus to one or more next-hop network devices of the apparatus;
    the processor further configured to replicate the packet for each one of the plurality of paths when the apparatus is a forwarding node, wherein replication of the packet produces a plurality of upstream packets;
    the interface further configured to transmit the upstream packets to the one or more next-hop network devices of the apparatus via the paths when the apparatus is the forwarding node, the paths including a first path to a destination and a second path the destination, wherein the second path is a backup path for the first path, and wherein each of the upstream packets is a replica of the received packet appended with identity information about the forwarding node by the forwarding node;
    the processor further configured to extract from the received packet the identity information of forwarding nodes visited by the received packet when the apparatus is an egress node; and
    the interface further configured to transmit to the source network device, when the apparatus is the egress node, a reply packet comprising the extracted identity information of the forwarding nodes visited by the received packet, wherein an egress path is identifiable based on the extracted identity information, the egress path comprising a series of next-hop devices from the source network device to the egress node, the series including the router.

2. The apparatus of claim 1, wherein the processor is further configured to, when the apparatus is the forwarding node:
reset a time to live (TTL) value included in the upstream packet to expire one hop away from the apparatus before transmitting the upstream packet; and
ignore expiry of the TTL value included in the received packet at the apparatus and not respond to the source network device in response to receipt of the received packet.

3. The apparatus of claim 2, wherein the identity information about the forwarding node includes a command value set to instruct the apparatus to reply to the source network device in response to the expiry of the TTL value included in the received packet at the apparatus.

4. The apparatus of claim 1, wherein when the apparatus is the egress node, the received packet is a first received packet, the reply packet is a first reply packet and the egress path is a first egress path, wherein:
the interface is further configured to receive a second packet;
the interface is further configured to transmit to the source network device a second reply packet comprising extracted upstream information from the second packet, wherein the extracted information from the first received packet is distinct from the extracted information from the second packet; and
the processor is further configured to append to the second reply packet an indication to the source network device, the indication indicating the second reply packet is from the egress node.

5. A method comprising:
receiving a packet at an intermediate network device from a network device, the packet being a replica of a single outbound packet originated at a source network device;
identifying one or more next hop network devices on a plurality of paths from the intermediate network device to a destination address;
adding, at the intermediate network device, an upstream type-length-value (TLV) including information regarding an identity of the intermediate network device to the packet;
replicating the packet for each of the plurality of paths, wherein replicated packets are a plurality of upstream packets that each include the upstream TLV including the information regarding the identity of the intermediate network device, and wherein the paths include a first path to the destination address and a second path to the destination address, wherein the second path is a backup path for the first path; and
forwarding each of the plurality of upstream packets via a respective one of the paths to a respective one of the one or more next hop devices.

6. The method of claim 5, further comprising:
setting a TTL value included in the upstream packet to expire one hop away from the intermediate network device.

7. The method of claim 5, further comprising: extracting, at an egress network device, the upstream TLV from the packet; and
sending a reply packet including at least the upstream TLV to the source network device.

8. The method of claim 5, further comprising identifying, at the source network device, a first path from the source network device to an egress network device and a second path from the source network device to the egress network device in response to the single outbound packet that originated at the source network device.

9. The method of claim 5, further comprising constructing a network tree, at the source network device, based on a reply packet received from each egress network device.

10. An apparatus comprising:
an interface configured to send an outbound packet to a network and receive a reply packet from each egress node of the network, wherein the reply packet identifies a path from the apparatus to a respective egress node, the path comprising an identity of a transit node of the network;
a memory configured to store the reply packet received from each egress node, wherein the outbound packet includes a time to live value set to expire at the transit node, and wherein the transit node is configured to:
suppress a response message to the apparatus acknowledging receipt of the outbound packet,
reset the time to live value of the outbound packet to expire at a next hop node of the transit node, and
send a replica of the outbound packet, via a plurality of paths to a destination address, over at least one neighboring network device of the transit node, and wherein the replica comprises identity information of the transit node, and wherein the paths include a primary path to the destination address and a backup path to the destination address; and
a processor configured to construct a tree of the network based on the reply packet from each egress node accessed from the memory, the tree representing regular paths and backup paths from the apparatus to each egress node of the network.

11. The apparatus of claim 10, wherein, the outbound packet comprises an upstream TLV including a command value that is set to instruct the transit node to send a response to the apparatus acknowledging receipt of the outbound packet.

12. The apparatus of claim 10, wherein the processor is further configured to:
determine a regular path from the apparatus to a particular egress node of the network based on contents of a first reply packet from the particular egress node; and
determine a backup path from the apparatus to the particular egress node based on contents of a second reply packet from the apparatus to the particular egress node.

13. The apparatus of claim 10, wherein the interface is further configured to receive a reply packet from every bud node of the network, wherein a bud node is a network device configured as both an egress node and a transit node, and wherein the reply packet from every bud node identifies a path from the apparatus to the bud node.

14. The apparatus of claim 10, wherein the processor is further configured to:
adjust, in response to receipt of a reply packet from the transit node, the time to live value of the outbound packet, the adjusted time to live value set to expire on a network device located one hop downstream from the transit node; and
resend, to the transit node, the outbound packet with the adjusted time to live value.

15. A method comprising:
sending a single outbound packet from a source network device to a network;
receiving the single outbound packet at a transit node of the network;
identifying one or more next hop devices of the transit node on a plurality of paths from the transit node to a destination address, wherein the paths include a first path to the destination and a second path to the destination, and wherein the second path is a backup path for the first path;

replicating the single outbound packet for each of the paths, wherein the replicating comprises producing replicas of the single outbound packet;

adding identity information of the transit node to the replicas of the single outbound packet;

transmitting the replicas of the single outbound packet via the paths from the transit node to the one or more next hop devices;

receiving, at the source network device, in response to the single outbound packet, a reply packet from each egress node of the network, wherein the reply packet from at least one egress node includes the identity information of the transit node added by the transit node to the single outbound packet; and constructing, at the source network device, a tree of the network based on path information included in the reply packet received from each egress node of the network.

16. The method of claim 15, wherein the source network device receives a plurality of reply packets in response to the single outbound packet sent to the network, the reply packets received from a plurality of egress nodes in the network.

17. The method of claim 15, wherein the identity information is included in an upstream type-length-value (TLV) further including a command value that is set to instruct the transit node to reply to the source network device and forward the packet to the one or more next hop network devices.

18. The method of claim 15, wherein the reply packet is a first reply packet from an egress node, the method further comprising:

receiving, at the source network device, a second reply packet from the egress node, wherein the first reply packet corresponds to a first path from the source network device to the egress node and the second reply packet corresponds to a second path from the source network device to the egress node.

19. The method of claim 15, further comprising receiving, at the source network device, a reply packet from every bud node of the network.

20. The method of claim 15, further comprising:

suppressing, at the transit node, a response message to the source network device in acknowledgement of receiving the single outbound packet, wherein the single outbound packet has a time to live (TTL) value set to expire at the transit node;

resetting, at the transit node, the TTL value of the single outbound packet to expire at a node that one of the replicas of the single outbound packet is transmitted to; and incrementing, at the transit node, the TTL value of the one of the replicas of the single outbound packet in response to receipt of a response from the node that the one of the replicas of the single outbound packet is transmitted to.

21. The method of claim 15, further comprising identifying, at the source network device, based on the reply packet received from the at least one egress node, a path from the source network device to the at least one egress node, wherein the reply packet includes the path from the source network device to the at least one egress node, and wherein the path comprises the identity information of the transit node and a node that is one hop away from the transit node.

22. The method of claim 15, wherein the network is a first network, and each egress node is configured to transmit data packets from the first network to a second network.

* * * * *